United States Patent [19]

Stockebrand

[11] Patent Number: 4,738,080
[45] Date of Patent: Apr. 19, 1988

[54] METHOD FOR TREATING GLASS TO PREVENT SWEATING THEREOF, AND GLASS TREATED BY SUCH A METHOD

[75] Inventor: Jo Stockebrand, Momignies, Belgium

[73] Assignee: Nouvelles Verreries de Momignies, Momignies, Belgium

[21] Appl. No.: 874,613

[22] Filed: Jun. 16, 1986

[30] Foreign Application Priority Data

Jun. 18, 1985 [BE] Belgium .................................. 902684

[51] Int. Cl.⁴ .......................................... B65B 51/10
[52] U.S. Cl. ........................................ 53/478; 65/60.8; 215/232
[58] Field of Search .................... 53/478; 215/232; 65/60.8, 43

[56] References Cited

U.S. PATENT DOCUMENTS

| | | | |
|---|---|---|---|
| 1,428,711 | 9/1922 | Roehrig | 215/232 |
| 1,916,977 | 7/1933 | Gutman | 215/232 |
| 3,501,042 | 3/1970 | Risch | 215/232 |
| 4,260,438 | 4/1981 | Dembicki | 215/232 X |
| 4,396,655 | 8/1983 | Graham | 215/232 X |
| 4,421,580 | 12/1983 | Dembicki | 215/232 X |

*Primary Examiner*—John Sipos
*Attorney, Agent, or Firm*—Abelman Frayne Rezac & Schwab

[57] ABSTRACT

There is described a method for treating glass to prevent sweating thereof, forming a container the opening of which should be sealingly closed by a lid fitted at least in that area thereof contacting the glass, with a layer from a polymer able to insure said lid adhering to said glass, for insuring preserving the product contained in said container, which method comprises laying at least over that container area bounding the opening thereof and contacting said lid, a continuous layer from ceramic enamel, and a container treated according to said method.

10 Claims, 1 Drawing Sheet

METHOD FOR TREATING GLASS TO PREVENT SWEATING THEREOF, AND GLASS TREATED BY SUCH A METHOD

This invention relates to a method for treating glass, to prevent sweating thereof, particularly opal glass, which comprises a container the opening of which should be sealingly closed by a lid, such as a lid from aluminum lined at least in that area thereof contacting the glass, with a layer from a polymer able to insure said lid adhering to the glass, for insuring the preserving of the product contained inside the container.

It is known that some glasses and more particularly opal glass, used notably for manufacturing containers to contain beauty preparations, do release some soda, which phenomenon is known as glass sweating, which results in a lack of adhesion to the containers of the lids closing the opening thereof and provided to preserve away from air to avoid deteriorating by oxidizing thereof, those preparations contained in such containers.

To obviate said serious drawback, it has already been considered treating the glass to prevent sweating thereof, by means of a gas such as freon. This method is however relatively critical to work out and it is moreover particularly costly.

To avoid such freon treatment of the glass, there has also been considered providing the containers in the location of the opening thereof, with a plastic material collar whereon the container closing lid comes to lie. This way of doing even if it does solve the problem of lid adhesion, has however for drawback on the one hand to be also costly in view of the cost of the collar which is to be fitted to the shape of each container opening and of arranging said collar thereon, and on the other hand to detract from the appearance of a container intended to contain luxury products.

The invention has for object to obviate said drawbacks and to provide a simple and efficient method retaining the original appearance of the glass container while allowing to obtain a perfect and permanent adhesion of that lid closing the container.

For this purpose according to the invention, said method comprises laying at least over that container area bounding the opening thereof and which will contact said lid, a continuous layer of ceramic enamel.

The invention has also for object a container treated according to said method.

The invention has further for object a method for causing to adhere permanently to a glass container, a lid, particularly a lid from aluminum lined at least in the area thereof contacting the glass, with a layer from a polymer able to insure said lid adhering to the glass.

According to the invention, said method comprises heating the lid aluminum in that area where it is lined with said polymer layer, to a temperature in the range of 120° C., and applying thereafter said lid on the container opening rim coated with ceramic enamel, to let the heated polymer layer contact said rim, applying the lid occuring under a pressure which is uniformly distributed over that area where the polymer layer contacts said ceramic enamel layer.

The invention finally pertains to a container sealed according to said latter method.

Other details and features of the invention will stand out from the following description of the drawings accompanying this specification and showing the methods and containers according to the invention.

In the various figures, the same reference numerals pertain to identical or similar elements.

Figure 1:
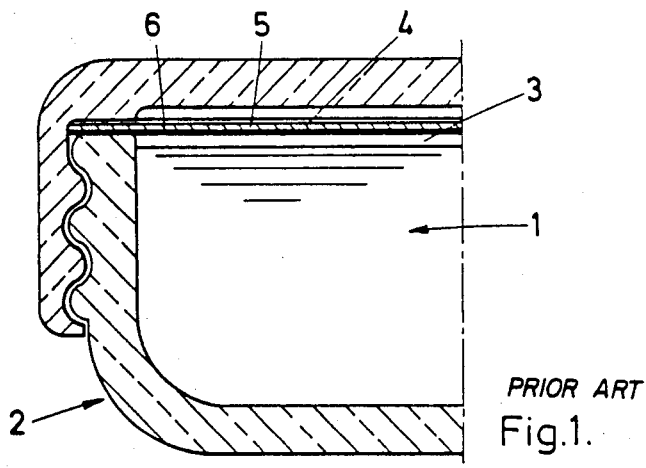
FIGS. 1 and 2 are views in elevation and section, with parts broken away, showing the state of the art.

As shown in FIG. 1, it has first been considered to insulate from the air, that preparation or product 1 contained in a glass container 2, sealing the opening 3 thereof with a lid 4 comprised of an aluminum sheet 5 lined in that area where it does contact the glass, with a polymer layer 6, such as the one known under trademark "SURLYN", intended to insure lid 4 adhering to the glass.

It has been noticed, mostly when the glass being used is an opal glass, that the lid adhesion to the glass had a very short time duration due to the glass sweating, which caused a substantial loss when storing products to be preserved away from air and thereby made glass and mostly opal glass unsuitable for manufacturing containers for this product kind.

Figure 2:
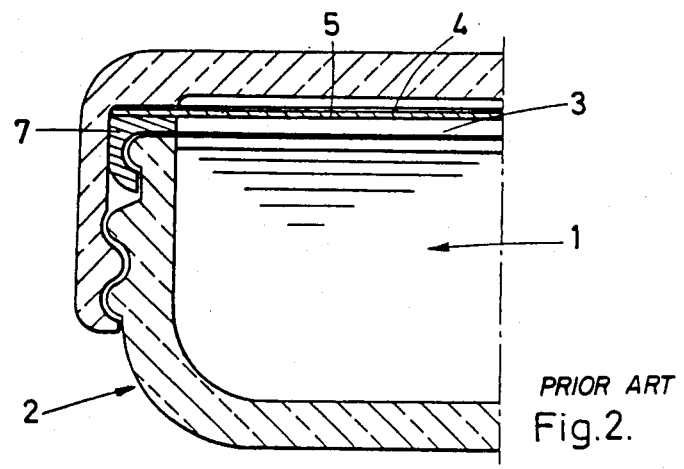

An existing solution to solve this problem comprises treating the glass with freon to minimize sweating. Such a too-costly solution has lead to another solution, shown in FIG. 2, which lies in fitting container 2 adjacent the opening 3 thereof, with a collar 7 from plastic material whereon lid 4 is secured.

Figure 3:
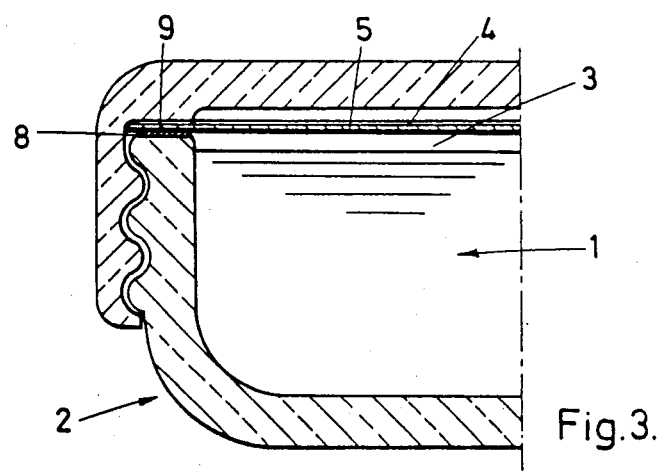
FIG. 3 is a view similar to FIGS. 1 and 2, showing the methods and a container according to the invention.

The solution as proposed according to the invention and shown in FIG. 3, comprises laying at least over that container area 8 bounding container opening 3, a continuous layer 9 from ceramic enamel which adheres naturally to glass and notably to opal glass. According to the invention, said layer 9 is laid by coating, such as roller coating, at room temperature, and it is thereafter subjected to annealing at a temperatue lying between 500° and 600° C.

To cause lid 4 to adhere to the container provided with the ceramic enamel layer 9, one heats according to the invention, the aluminum from lid 4 in that location where it is lined with polymer layer 6, to a temperature in the range of 120° C., and said lid 4 is then applied to the rim of said opening 3 to have said polymer layer 6 having been heated through the aluminum, contact said rim lined with said ceramic enamel layer 9, applying said lid 4 occuring under a pressure which is regularly distributed all over that area where the polymer layer contacts the ceramic enamel layer 9.

It must be understood that this invention is in no way limited to the above-described embodiment and that many changes may be brought thereto without departing from the scope of the invention as defined by the appended claims.

I claim:

1. A method for permanently sealing a glass container having an opening defined by a rim and adapted to be sealingly closed by a lid, said lid being lined, at least in that area thereof contacting the glass, with a layer of a polymer capable of insuring adhesion of said lid to said glass, said method comprising providing a container having a opening rim coated with a ceramic enamel layer, heating said lid in the area where it is lined with said polymer layer to a temperature in the range of 120° C., thereafter applying said lid on the opening rim of the container which is coated with a ceramic enamel layer whereby the heated polymer layer contacts said rim, said lid being applied under a uniformly distributed pressure over the area where the polymer layer is in contact with the ceramic enamel layer.

2. The method in accordance with claim 1 wherein the ceramic enamel layer has been annealed to the rim of the container at a temperature between 500° C. and 600° C.

3. The method in accordance with claim 1 wherein the glass container is made of opal glass.

4. The method in accordance with claim 1 wherein the lid is made of aluminum.

5. A method of treating glass to prevent the sweating thereof which comprises forming a glass container having an opening which is adapted to be sealingly closed by a lid, said lid being lined, at least in that area thereof contacting the glass, with a layer of a polymer capable of insuring the adhesion of said lid to said glass to preserve the product within the container, said method comprising laying a continuous layer of ceramic enamel at room temperature over that container area bounding the opening thereof and which contacts the lid.

6. The method in accordance with claim 5 in which said continuous ceramic layer is laid by roller coating.

7. The method in accordance with claim 5 wherein the lid is made of aluminum.

8. The method in accordance with claim 5 wherein the glass container is made of opal glass.

9. Method for treating glass as defined in claim 6 in which said continuous ceramic layer is laid by coating.

10. Method for treating glass as defined in claim 5, in which said ceramic enamel layer laid over the glass is subjected to annealing at a temperature lying between 500° and 600° C.

* * * * *